(12) United States Patent
Watanabe et al.

(10) Patent No.: US 11,975,771 B2
(45) Date of Patent: May 7, 2024

(54) VEHICLE STEERING DEVICE

(71) Applicant: NSK Ltd., Tokyo (JP)

(72) Inventors: Sakiya Watanabe, Kanagawa (JP); Kenji Mori, Kanagawa (JP)

(73) Assignee: NSK LTD., Tokyo (JP)

( * ) Notice: Subject to any disclaimer, the term of this patent is extended or adjusted under 35 U.S.C. 154(b) by 221 days.

(21) Appl. No.: 17/642,754

(22) PCT Filed: Oct. 8, 2020

(86) PCT No.: PCT/JP2020/038170
§ 371 (c)(1),
(2) Date: Mar. 14, 2022

(87) PCT Pub. No.: WO2021/085070
PCT Pub. Date: May 6, 2021

(65) Prior Publication Data
US 2022/0332362 A1 Oct. 20, 2022

(30) Foreign Application Priority Data

Oct. 31, 2019 (JP) .................................. 2019-199286

(51) Int. Cl.
*B62D 5/04* (2006.01)
*B62D 15/00* (2006.01)
*B62D 15/02* (2006.01)

(52) U.S. Cl.
CPC ........... *B62D 5/046* (2013.01); *B62D 5/0466* (2013.01); *B62D 5/049* (2013.01); *B62D 5/0493* (2013.01);
(Continued)

(58) Field of Classification Search
CPC .... B62D 5/046; B62D 5/0466; B62D 5/0481; B62D 5/049; B62D 5/0493; B62D 15/021; B62D 15/022; B62D 15/0225
(Continued)

(56) References Cited

U.S. PATENT DOCUMENTS

| | | | |
|---|---|---|---|
| 2006/0200290 A1* | 9/2006 | Chino | B62D 6/008 180/443 |
| 2013/0124045 A1* | 5/2013 | Suzuki | B62D 7/159 701/41 |
| 2014/0172236 A1 | 6/2014 | Nishikawa et al. | |

FOREIGN PATENT DOCUMENTS

| | | |
|---|---|---|
| JP | 2003-175846 A | 6/2003 |
| JP | 2005-053404 A | 3/2005 |

(Continued)

OTHER PUBLICATIONS

International Search Report of PCT/JP2020/038170 dated Nov. 17, 2020 [PCT/ISA/210].

(Continued)

*Primary Examiner* — Erick R Solis
(74) *Attorney, Agent, or Firm* — Sughrue Mion, PLLC

(57) ABSTRACT

A vehicle steering device includes a reaction force device, a drive device, a first ECU configured to control the reaction force device, a second ECU configured to control the drive device, a first rudder angle sensor and a second rudder angle sensor each configured to detect a steering angle of a wheel and output the detected steering angle to the second ECU, and a communication line that transmits at least one of steering angles of the wheel as detected values of the first rudder angle sensor and the second rudder angle sensor from the second ECU to the first ECU.

2 Claims, 11 Drawing Sheets

(52) U.S. Cl.
CPC ....... *B62D 15/022* (2013.01); *B62D 15/0225* (2013.01)

(58) Field of Classification Search
USPC ...................................... 701/41–43
See application file for complete search history.

(56) References Cited

FOREIGN PATENT DOCUMENTS

| | | |
|---|---|---|
| JP | 2005-104439 A | 4/2005 |
| JP | 2006-205878 A | 8/2006 |
| JP | 2006-218992 A | 8/2006 |
| JP | 2009-227276 A | 10/2009 |
| JP | 2009-248660 A | 10/2009 |
| JP | 2010-254266 A | 11/2010 |
| JP | 2013-028312 A | 2/2013 |
| JP | 2014-210496 A | 11/2014 |

OTHER PUBLICATIONS

Office Action issued Mar. 5, 2024 in Japanese Application No. 2021-554259.

* cited by examiner

VEHICLE STEERING DEVICE

CROSS REFERENCE TO RELATED APPLICATIONS

This application is a National Stage of International Application No. PCT/JP2020/038170 filed on Oct. 8, 2020, claiming priority based on Japanese Patent Application No. 2019-199286 filed on Oct. 31, 2019.

FIELD

The present invention relates to a vehicle steering device.

BACKGROUND

A steer-by-wire (SBW) vehicle steering device in which a force feedback actuator (FFA; steering mechanism) through which a driver performs steering and a road wheel actuator (RWA; rotation mechanism) configured to steer a vehicle are mechanically separated from each other is available as a vehicle steering device. Such a SBW vehicle steering device typically has a configuration in which the steering mechanism and the rotation mechanism are electrically connected to each other through a control unit (electronic control unit: ECU), and control between the steering mechanism and the rotation mechanism is performed by electric signals. On the other hand, a configuration in which the steering mechanism and rotation mechanism are controlled by different ECUs, respectively, in the SBW vehicle steering device can be thought (for example, Patent Literature 1).

CITATION LIST

Patent Literature

Patent Literature 1: Japanese Patent Application Laid-open No. 2006-218992

SUMMARY

Technical Problem

A vehicle system is required to have high redundancy for achieving fail-safe functions of driving continuation, safe stop, and the like at anomaly of components. In particular, a vehicle is potentially brought into a steering impossible state, for example, when a communication system between ECUs fails in a SBW vehicle steering device in which a steering mechanism and a rotation mechanism are mechanically separated from each other and different ECUs are provided for the steering mechanism and the rotation mechanism, respectively. On the other hand, excessive provision of redundancy such as duplication of main components such as various sensors, control systems, communication systems potentially cause manufacturing cost increase.

The present invention is made in view of the above-described problem and intended to provide a vehicle steering device that can achieve fail-safe functions of a vehicle system with a simple configuration.

Solution to Problem

To achieve the above object, a vehicle steering device according to an embodiment of the present invention comprising: a reaction force device configured to apply steering reaction force to a wheel; a drive device configured to turn tires in accordance with steering of the wheel; a first control unit configured to control the reaction force device; a second control unit configured to control the drive device; a plurality of rudder angle sensors configured to detect steering angles of the wheel and output the detected steering angles to the second control unit; and a communication system configured to transmit at least one of the steering angles of the wheel as detected values of the rudder angle sensors from the second control unit to the first control unit, wherein the second control unit sets any one of the detected values of the rudder angle sensors to be a steering angle of the wheel, controls the drive device, and outputs the steering angle of the wheel to the first control unit through the communication system, and the first control unit controls the reaction force device based on the steering angle of the wheel, the steering angle being input from the second control unit through the communication system.

With the above-described configuration, it is possible to provide redundancy for the steering angle of the wheel with a plurality of rudder angle sensors. Furthermore, since the detected values of the rudder angle sensors are input to a second control unit that controls the drive device, it is possible to continue driving by the drive device even when the communication system with a first control unit that controls the reaction force device has failed, and thus it is possible to achieve fail-safe functions of a vehicle system with a simple configuration.

As a desirable embodiment of the vehicle steering device, it is preferable that the rudder angle sensors include a first rudder angle sensor and a second rudder angle sensor, when a detected value of the first rudder angle sensor is received, the second control unit sets the detected value to be the steering angle of the wheel, controls the drive device, and outputs the steering angle of the wheel to the first control unit through the communication system, and when the detected value of the first rudder angle sensor is not able to be received, the second control unit sets a detected value of the second rudder angle sensor to be the steering angle of the wheel, controls the drive device, and outputs the steering angle of the wheel to the first control unit through the communication system.

Accordingly, it is possible to control a vehicle based on the steering angle of the wheel, the steering angle being detected by any of the first rudder angle sensor and the second rudder angle sensor.

As a desirable embodiment of the vehicle steering device, it is preferable that the first control unit performs predetermined anomaly processing when the steering angle of the wheel is not able to be received or the communication system has failed.

In the anomaly processing at the first control unit, for example, a steering reaction force control function of the reaction force device is stopped, and a driver is notified of the stop of the steering reaction force control function. Accordingly, it is possible to achieve fail-safe functions of the vehicle system.

As a desirable embodiment of the vehicle steering device, it is preferable that the second control unit performs predetermined anomaly processing when all the detected values of the rudder angle sensors cannot be received.

In the anomaly processing at the second control unit, for example, safe stop processing is performed in accordance with an automated driving level, and the driver is notified of failure of a steering angle detection function. Accordingly, it is possible to achieve safer fail-safe functions of the vehicle system.

Advantageous Effects of Invention

According to the present invention, it is possible to provide a vehicle steering device that can achieve fail-safe functions of a vehicle system with a simple configuration.

DESCRIPTION OF EMBODIMENTS

Modes for carrying out the invention (hereinafter referred to as embodiments) will be described below in detail with reference to the accompanying drawings. Note that, the present invention is not limited by the following embodiments. In addition, components in the embodiments described below include their equivalents such as those that could be easily thought of by the skilled person in the art and those identical in effect. Moreover, components disclosed in the embodiments described below may be combined as appropriate.

Figure 1:
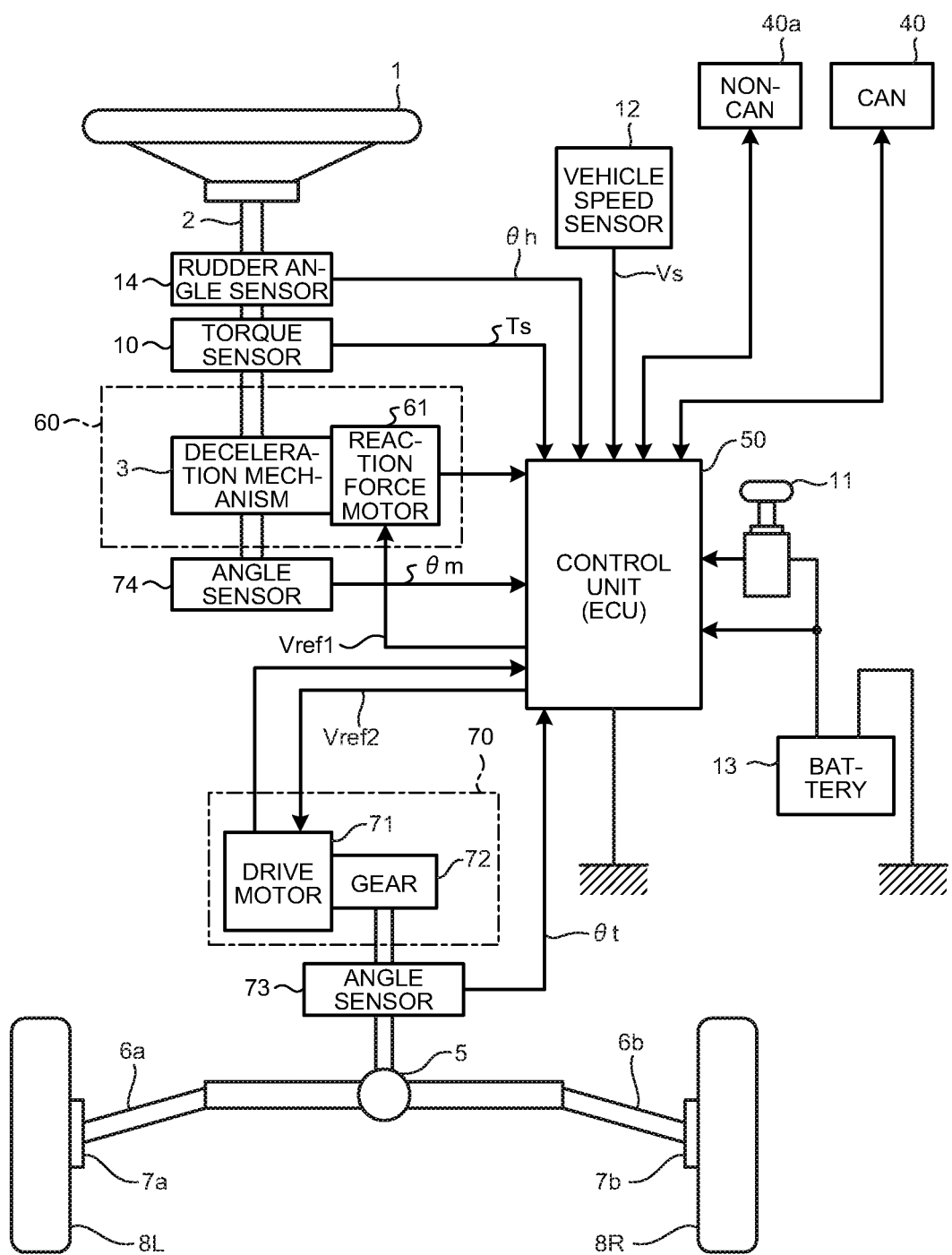
FIG. 1 is a diagram illustrating the entire configuration of a steer-by-wire vehicle steering device.

FIG. 1 is a diagram illustrating the entire configuration of a steer-by-wire vehicle steering device. The steer-by-wire (SBW) vehicle steering device (hereinafter also referred to as an "SBW system") illustrated in FIG. 1 is a system including a reaction force device 60 and a drive device 70 and configured to transfer, by an electric signal, an operation of a wheel 1 to a rotation mechanism including steering wheels 8L and 8R. In the following, a configuration in which a control unit (ECU) 50 as a control unit controls both the reaction force device 60 and the drive device 70 is exemplarily presented to describe a specific operation of the SBW system.

The reaction force device 60 includes a deceleration mechanism 3 and a reaction force motor 61. These components are provided to a column shaft 2 of the wheel 1.

In addition, for example, a torque sensor 10 configured to detect steering torque Ts of the wheel 1, and a rudder angle sensor 14 configured to detect a steering angle θh thereof are provided to the column shaft 2 of the wheel 1.

The reaction force device 60 transfers, to the driver as reaction force torque, the motion state of a vehicle conveyed from the steering wheels 8L and 8R. The reaction force torque is generated by the reaction force motor 61.

Although a SBW system of a certain type includes no torsion bar, the SBW system illustrated in FIG. 1 is a type including a torsion bar, and detects the steering torque Ts by the torque sensor 10. In addition, an angle sensor 74 detects a motor angle θm of the reaction force motor 61.

The drive device 70 includes a drive motor 71 and a gear 72. Drive power generated by the drive motor 71 is coupled to the steering wheels 8L and 8R through the gear 72, a pinion rack mechanism 5, and tie rods 6a and 6b and further through hub units 7a and 7b.

The drive device 70 drives the drive motor 71 in accordance with steering of the wheel 1 by the driver, applies the drive power thereof to the pinion rack mechanism 5 through the gear 72, and turns the steering wheels 8L and 8R through the tie rods 6a and 6b. To cooperatively control the reaction force device 60 and the drive device 70, the ECU 50 generates, based on a vehicle speed Vs from a vehicle speed sensor 12 and other information in addition to information such as the steering angle θh and the turning angle θt output from both the devices, a voltage control command value Vref1 for driving and controlling the reaction force motor 61 and a voltage control command value Vref2 for driving and controlling the drive motor 71.

In addition, an angle sensor 73 configured to detect the turning angle θt of the steering wheels 8L and 8R is disposed near the pinion rack mechanism 5.

Electric power is supplied from a battery 13 to the control unit (ECU) 50, and an ignition key signal is input to the control unit 50 through an ignition key 11. The control unit 50 performs calculation of a current command value based on the steering torque Ts detected by the torque sensor 10 and the vehicle speed Vs detected by the vehicle speed sensor 12 and controls current supplied to the reaction force motor 61 and the drive motor 71.

The control unit 50 is connected to an on-board network such as a controller area network (CAN) 40 through which various kinds of information of the vehicle are transmitted and received. In addition, a control unit 30 is connectable to a non-CAN 40a configured to transmit and receive communication other than the CAN 40, analog and digital signals, radio wave, and the like.

Figure 2:
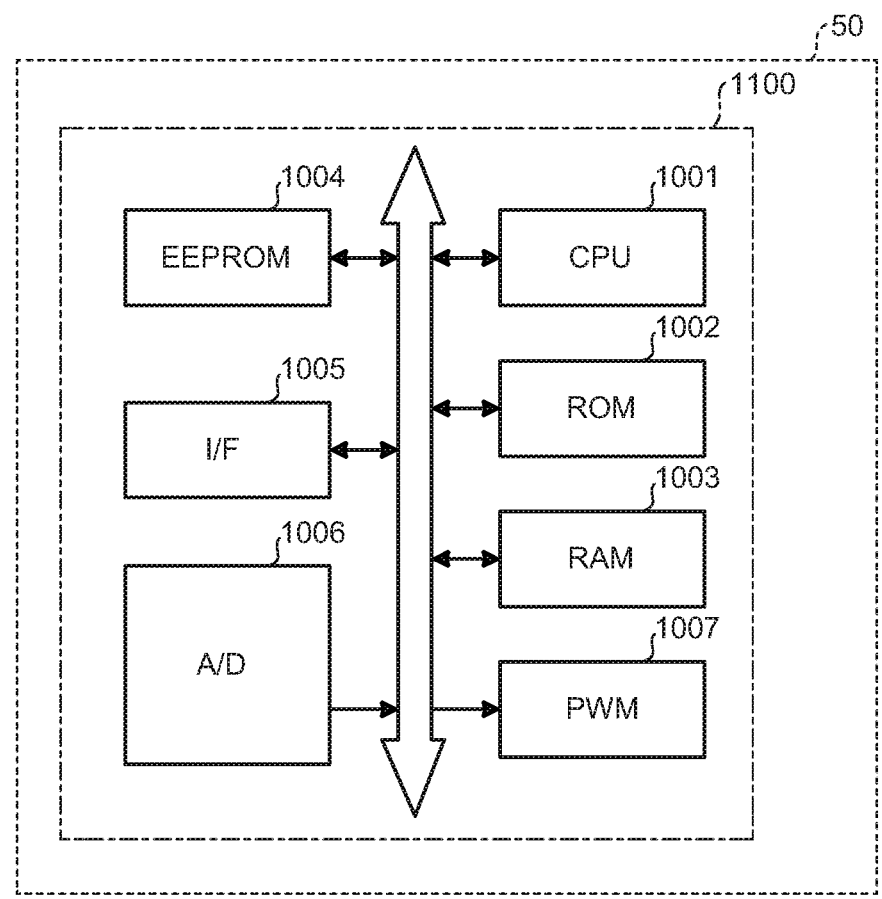
FIG. 2 is a schematic diagram illustrating a hardware configuration of a control unit configured to control a SBW system.

The control unit 50 is mainly configured as a CPU (including an MCU and an MPU). FIG. 2 is a schematic diagram illustrating a hardware configuration of the control unit configured to control the SBW system.

A control computer 1100 configured as the control unit 50 includes a central processing unit (CPU) 1001, a read only memory (ROM) 1002, a random access memory (RAM) 1003, an electrically erasable programmable ROM (EEPROM) 1004, an interface (I/F) 1005, an analog/digital (A/D) converter 1006, and a pulse width modulation (PWM) controller 1007, and these components are connected to a bus.

The CPU 1001 is a processing device configured to execute a computer program for control (hereinafter referred to as a control program) of the SBW system and control the SBW system.

The ROM 1002 stores a control program for controlling the SBW system. In addition, the RAM 1003 is used as a work memory for operating the control program. The EEPROM 1004 stores, for example, control data input to and output from the control program. The control data is used on the control program loaded onto the RAM 1003 after the control unit 30 is powered on, and is overwritten to the EEPROM 1004 at a predetermined timing.

The ROM 1002, the RAM 1003, the EEPROM 1004, and the like are storage devices configured to store information and are storage devices (primary storage devices) directly accessible from the CPU 1001.

The A/D converter 1006 receives, for example, signals of the steering torque Ts and the steering angle θh and converts the signals into digital signals.

The interface 1005 is connected to the CAN 40. The interface 1005 receives a signal (vehicle speed pulse) of a vehicle speed V from the vehicle speed sensor 12.

The PWM controller 1007 outputs a PWM control signal of each UVW phase based on current command values to the reaction force motor 61 and the drive motor 71.

Figure 3:
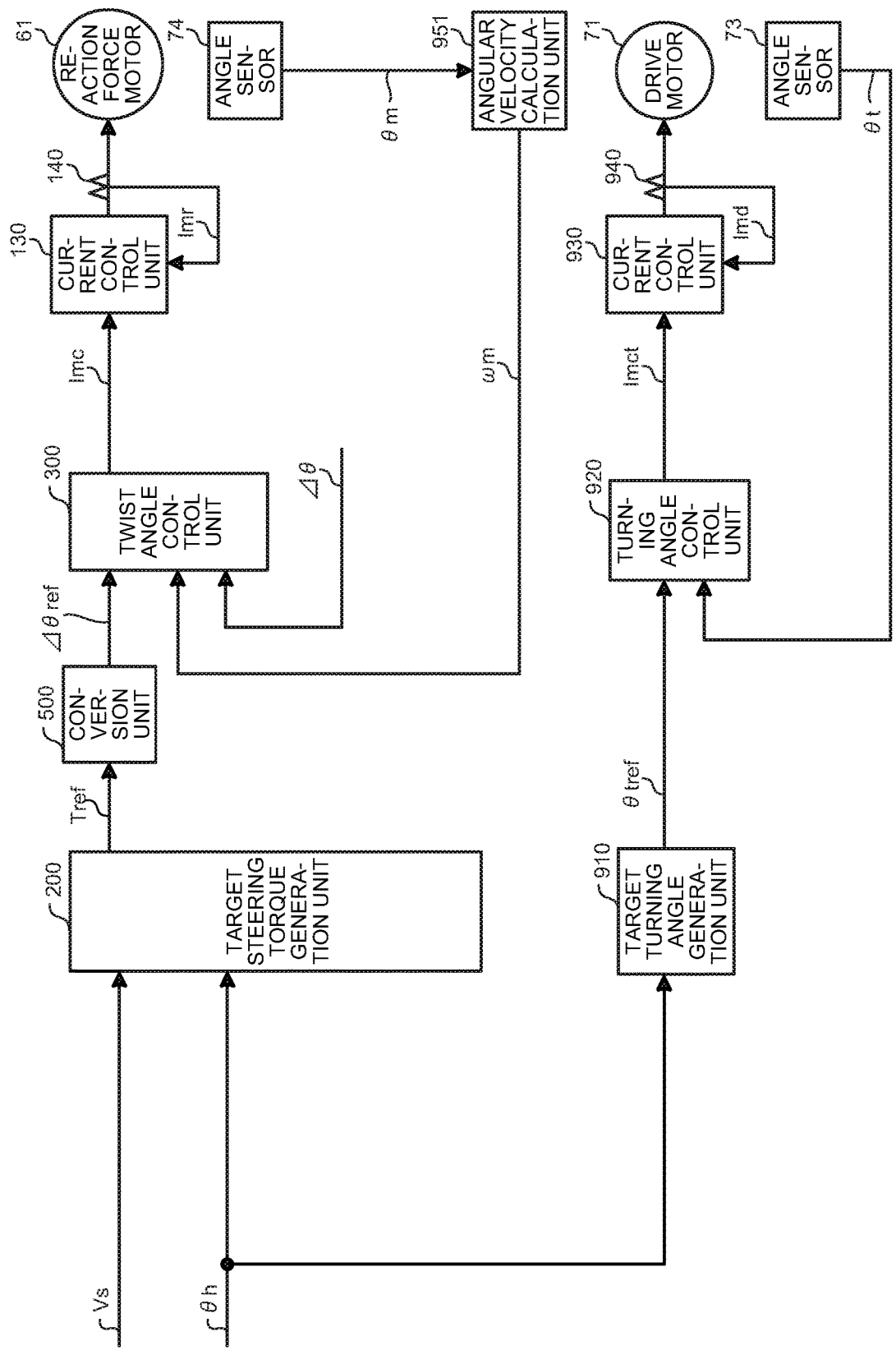
FIG. 3 is a diagram illustrating an exemplary internal block configuration of the control unit.

FIG. 3 is a diagram illustrating an exemplary internal block configuration of the control unit. In the present embodiment, control (hereinafter referred to as "twist angle control") of a twist angle Δθ and control (hereinafter referred to as "turning angle control") of the turning angle θt are performed, the reaction force device is controlled by the twist angle control, and the drive device is controlled by the turning angle control. Note that, the drive device may be controlled by another control method.

The control unit 50 includes, as an internal block configuration, a target steering torque generation unit 200, a twist angle control unit 300, a conversion unit 500, a target turning angle generation unit 910, and a turning angle control unit 920.

The target steering torque generation unit 200 generates a target steering torque Tref as a target value of steering torque when a steering system of the vehicle is assisted and controlled in the present disclosure. The conversion unit 500 converts the target steering torque Tref into a target twist angle Δθref. The twist angle control unit 300 generates a motor current command value Imc as a control target value of current supplied to the reaction force motor 61.

In the twist angle control, such control that the twist angle Δθ follows the target twist angle Δθref calculated through the target steering torque generation unit 200 and the conversion unit 500 by using the steering angle θh and the like is performed. The motor angle θm of the reaction force motor 61 is detected by the angle sensor 74, and a motor angular velocity θm is calculated by differentiating the motor angle θm at an angular velocity calculation unit 951. The turning angle θt of the drive motor 71 is detected by the angle sensor 73. In addition, a current control unit 130 performs current control by driving the reaction force motor 61 based on the motor current command value Imc output from the twist angle control unit 300 and a current value Imr of the reaction force motor 61 detected by a motor current detector 140.

The twist angle control unit 300 will be described below with reference to FIG. 4.

Figure 4:
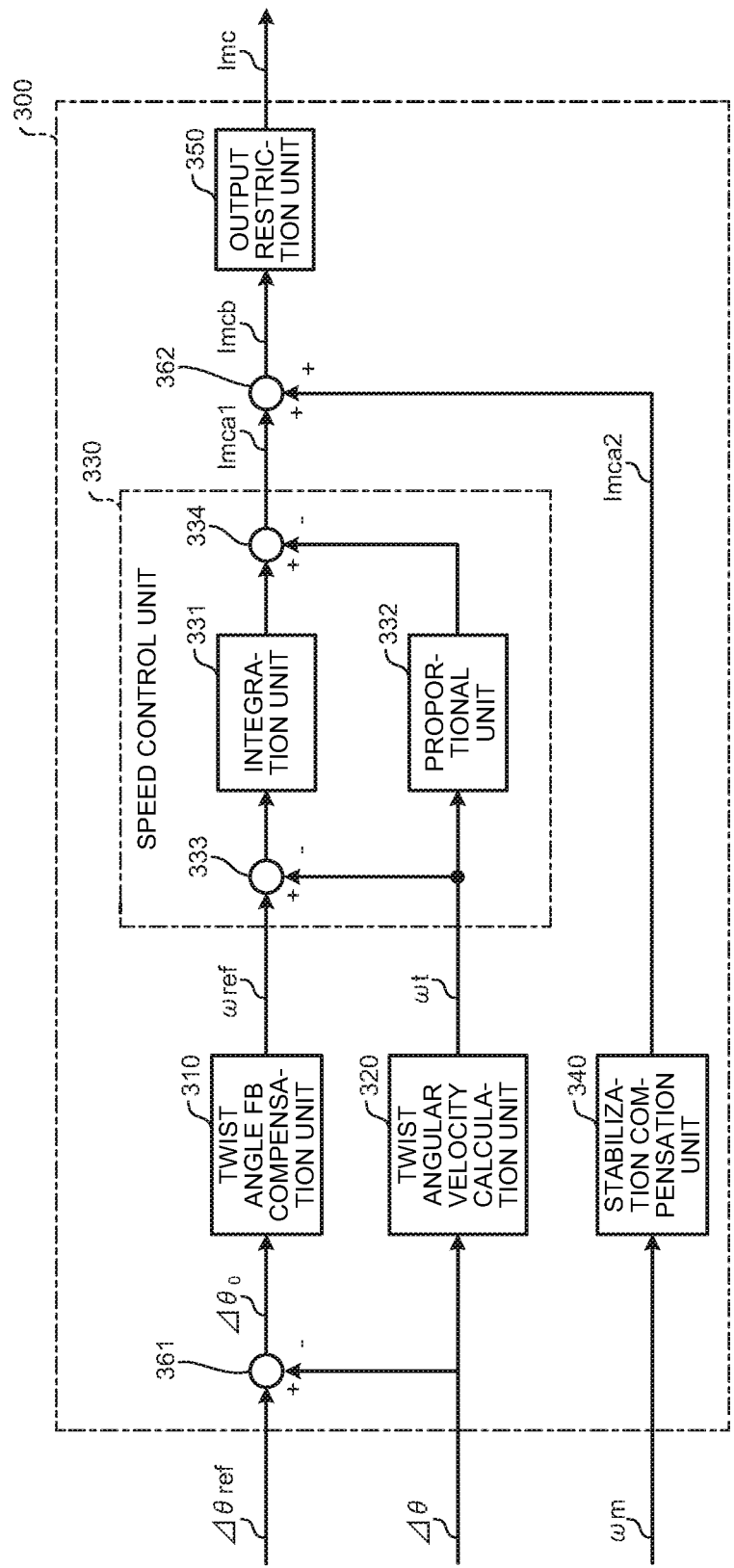
FIG. 4 is a block diagram illustrating an exemplary configuration of a twist angle control unit.

FIG. 4 is a block diagram illustrating an exemplary configuration of the twist angle control unit. The twist angle control unit 300 calculates the motor current command value Imc based on the target twist angle Δθref, the twist angle Δθ, and the motor angular velocity ωm. The twist angle control unit 300 includes a twist angle feedback (FB) compensation unit 310, a twist angular velocity calculation unit 320, a speed control unit 330, a stabilization compensation unit 340, an output restriction unit 350, a subtraction unit 361, and an addition unit 362.

The target twist angle Δθref output from the conversion unit 500 is input to the subtraction unit 361 through addition. The twist angle Δθ is input to the subtraction unit 361 through subtraction and also input to the twist angular velocity calculation unit 320. The motor angular velocity ωm is input to the stabilization compensation unit 340.

The twist angle FB compensation unit 310 multiplies a deviation Δθ0 between the target twist angle Δθref and the twist angle Δθ, which is calculated at the subtraction unit 361, by a compensation value CFB (transfer function), and outputs a target twist angular velocity ωref with which the twist angle Δθ follows the target twist angle Δθref. The compensation value CFB may be a simple gain Kpp, or a typically used compensation value such as a PI control compensation value.

The target twist angular velocity ωref is input to the speed control unit 330. With the twist angle FB compensation unit 310 and the speed control unit 330, it is possible to cause the twist angle Δθ to follow the target twist angle Δθref, thereby achieving desired steering torque.

The twist angular velocity calculation unit 320 calculates a twist angular velocity ωt by performing differential arithmetic processing on the twist angle Δθ. The twist angular velocity ωt is output to the speed control unit 330. The twist angular velocity calculation unit 320 may perform, as differential calculation, pseudo differentiation with a HPF and a gain. In addition, the twist angular velocity calculation unit 320 may calculate the twist angular velocity ωt by another means or not from the twist angle Δθ and may output the calculated twist angular velocity ωt to the speed control unit 330.

The speed control unit 330 calculates, by I-P control (proportional processing PI control), a motor current command value Imca1 with which the twist angular velocity ωt follows the target twist angular velocity ωref.

A subtraction unit 333 calculates a difference (ωref−ωt) between the target twist angular velocity ωref and the twist angular velocity ωt. An integration unit 331 integrates the difference (ωref−ωt) between the target twist angular velocity ωref and the twist angular velocity ωt, and inputs a result of the integration to a subtraction unit 334 through addition.

The twist angular velocity ωt is also output to a proportional unit 332. The proportional unit 332 performs proportional processing with a gain Kvp on the twist angular velocity ωt and inputs a result of the proportional processing to the subtraction unit 334 through subtraction. A result of the subtraction at the subtraction unit 334 is output as the motor current command value Imca1. Note that, the speed control unit 330 may calculate the motor current command value Imca1 not by I-P control but by a typically used control method such as PI control, P (proportional) control, PID (proportional-integral-differential) control, PI-D control (differential processing PID control), model matching control, or model reference control.

The stabilization compensation unit 340 has a compensation value Cs (transfer function), and calculates a motor current command value Imca2 from the motor angular velocity ωm. When gains of the twist angle FB compensation unit 310 and the speed control unit 330 are increased to improve the following capability and the disturbance characteristic, a controlled oscillation phenomenon occurs in a higher range. To avoid this, the transfer function (Cs) that is necessary for stabilization of the motor angular velocity ωm is set to the stabilization compensation unit 340. Accordingly, stabilization of the entire EPS control system can be achieved.

The addition unit 362 adds the motor current command value Imca1 from the speed control unit 330 and the motor current command value Imca2 from the stabilization compensation unit 340, and outputs a result of the addition as a motor current command value Imcb.

The upper and lower limit values of the motor current command value Imcb are set to the output restriction unit 350 in advance. The output restriction unit 350 outputs the motor current command value Imc with restriction on the upper and lower limit values of the motor current command value Imcb.

Note that, the configuration of the twist angle control unit 300 in the present embodiment is exemplary and may be different from the configuration illustrated in FIG. 4. For example, the twist angle control unit 300 need not necessarily include the stabilization compensation unit 340.

In the turning angle control, a target turning angle θtref is generated at a target turning angle generation unit 910 based on the steering angle θh. The target turning angle θtref together with the turning angle θt is input to a turning angle control unit 920, and a motor current command value Imct with which the turning angle θt is equal to the target turning angle θtref is calculated at the turning angle control unit 920. Then, with configurations and operations same as those of the current control unit 130, a current control unit 930 performs current control by driving the drive motor 71 based on the motor current command value Imct and a current value Imd of the drive motor 71 detected by a motor current detector 940.

The target turning angle generation unit 910 will be described below with reference to FIG. 5.

Figure 5:
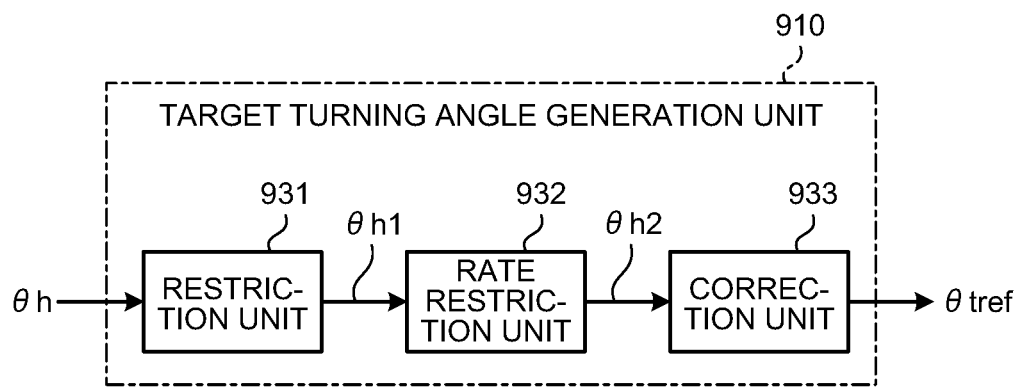
FIG. 5 is a block diagram illustrating an exemplary configuration of a target turning angle generation unit.

FIG. 5 is a block diagram illustrating an exemplary configuration of the target turning angle generation unit. The target turning angle generation unit 910 includes a restriction unit 931, a rate restriction unit 932, and a correction unit 933.

The restriction unit 931 outputs a steering angle θh1 with restriction on the upper and lower limit values of the steering angle θh. Similarly to the output restriction unit 350 in the twist angle control unit 300 illustrated in FIG. 4, the upper and lower limit values of the steering angle θh are set in advance and restricted.

To avoid abrupt change of the steering angle, the rate restriction unit 932 provides restriction by setting a restriction value for the change amount of the steering angle θh1 and outputs the steering angle θh2. For example, the change amount is set to be the difference from the steering angle θh1 at the previous sample. When the absolute value of the change amount is larger than a predetermined value (restriction value), the steering angle θh1 is increased or decreased so that the absolute value of the change amount becomes equal to the restriction value, and the increased or decreased steering angle θh1 is output as the steering angle θh2. When the absolute value of the change amount is equal to or smaller than the restriction value, the steering angle θh1 is directly output as the steering angle θh2. Note that, restriction may be provided by setting the upper and lower limit values of the change amount instead of setting the restriction value for the absolute value of the change amount, or that restriction may be provided on a change rate or a difference rate in place of the change amount.

The correction unit 933 corrects the steering angle θh2 and outputs the target turning angle θtref.

The turning angle control unit 920 will be described below with reference to FIG. 6.

Figure 6:
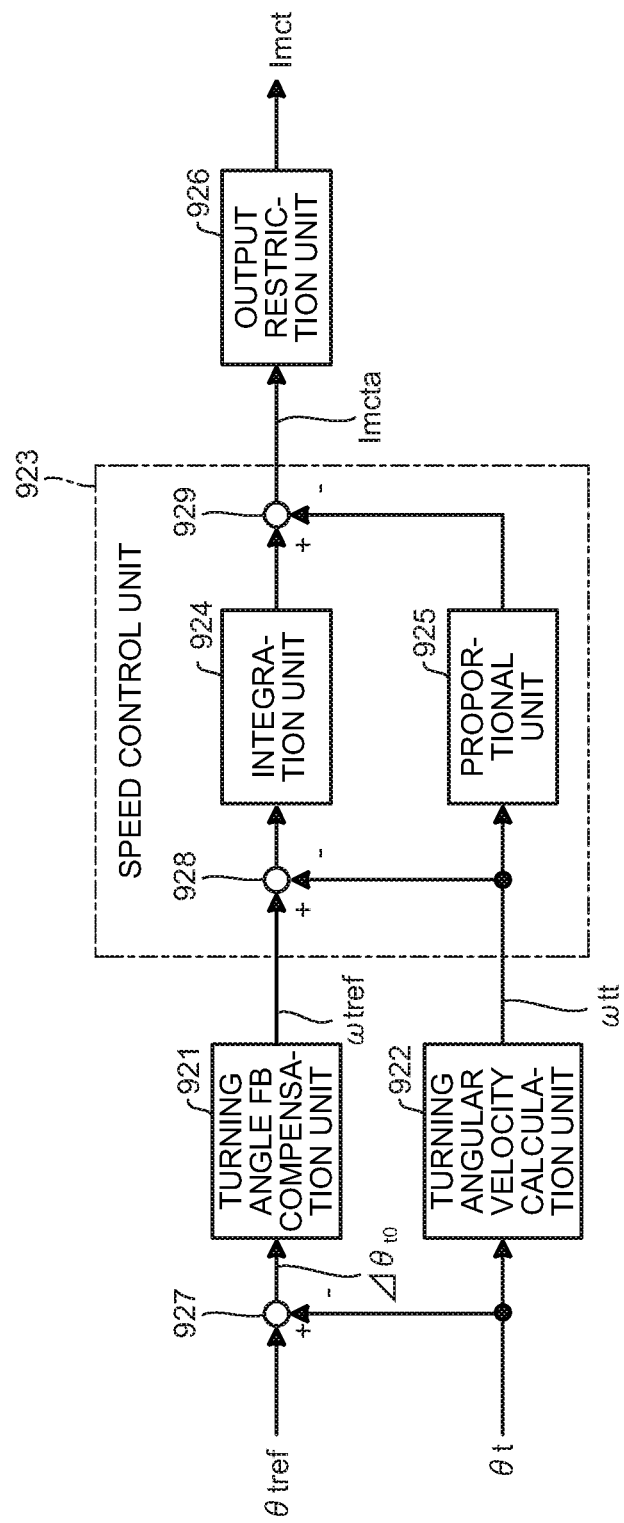
FIG. 6 is a block diagram illustrating an exemplary configuration of a turning angle control unit.

FIG. 6 is a block diagram illustrating an exemplary configuration of the turning angle control unit. The turning angle control unit 920 calculates the motor current command value Imct based on the target turning angle θtref and the turning angle θt of the steering wheels 8L and 8R. The turning angle control unit 920 includes a turning angle feedback (FB) compensation unit 921, a turning angular velocity calculation unit 922, a speed control unit 923, an output restriction unit 926, and a subtraction unit 927.

The target turning angle θtref output from the target turning angle generation unit 910 is input to the subtraction unit 927 through addition. The turning angle θt is input to a subtraction unit 927 through subtraction and also input to the turning angular velocity calculation unit 922.

The turning angle FB compensation unit 921 multiplies a deviation Δθt0 between a target turning angular velocity ωtref and the turning angle θt, which is calculated at the subtraction unit 927, by the compensation value CFB (transfer function), and outputs the target turning angular velocity ωtref with which the turning angle θt follows the target turning angle θtref. The compensation value CFB may be a simple gain Kpp, or a typically used compensation value such as a PI control compensation value.

The target turning angular velocity ωtref is input to the speed control unit 923. With the turning angle FB compensation unit 921 and the speed control unit 923, it is possible to cause the target turning angle θtref to follow the turning angle θt, thereby achieving desired torque.

The turning angular velocity calculation unit 922 calculates a turning angular velocity ωtt by performing differential arithmetic processing on the turning angle θt. The turning angular velocity ωtt is output to the speed control unit 923. The speed control unit 923 may perform, as differential calculation, pseudo differentiation with a HPF and a gain. In addition, the speed control unit 923 may calculate the turning angular velocity ωtt by another means or not from the turning angle θt and may output the calculated turning angular velocity ωtt to the speed control unit 923.

The speed control unit 923 calculates, by I-P control (proportional processing PI control), a motor current command value Imcta with which the turning angular velocity ωtt follows the target turning angular velocity ωtref. Note that, the speed control unit 923 may calculate the motor current command value Imcta not by I-P control but by a typically used control method such as PI control, P (proportional) control, PID (proportional-integral-differential) control, PI-D control (differential processing PID control), model matching control, or model reference control.

A subtraction unit 928 calculates a difference (ωtref−ωtt) between the target turning angular velocity ωtref and the turning angular velocity ωtt. An integration unit 924 integrates the difference (ωtref−ωtt) between the target turning angular velocity ωtref and the turning angular velocity ωtt and inputs a result of the integration to a subtraction unit 929 through addition.

The turning angular velocity ωtt is also output to a proportional unit 925. The proportional unit 925 performs proportional processing on the turning angular velocity ωtt and outputs a result of the proportional processing to the output restriction unit 926 as the motor current command value Imcta.

The upper and lower limit values of the motor current command value Imcta are set to the output restriction unit 926 in advance. The output restriction unit 926 outputs the motor current command value Imct with restriction on the upper and lower limit values of the motor current command value Imcta.

Note that, the configuration of the turning angle control unit 920 in the present embodiment is exemplary and may be different from the configuration illustrated in FIG. 6.

Figure 7:
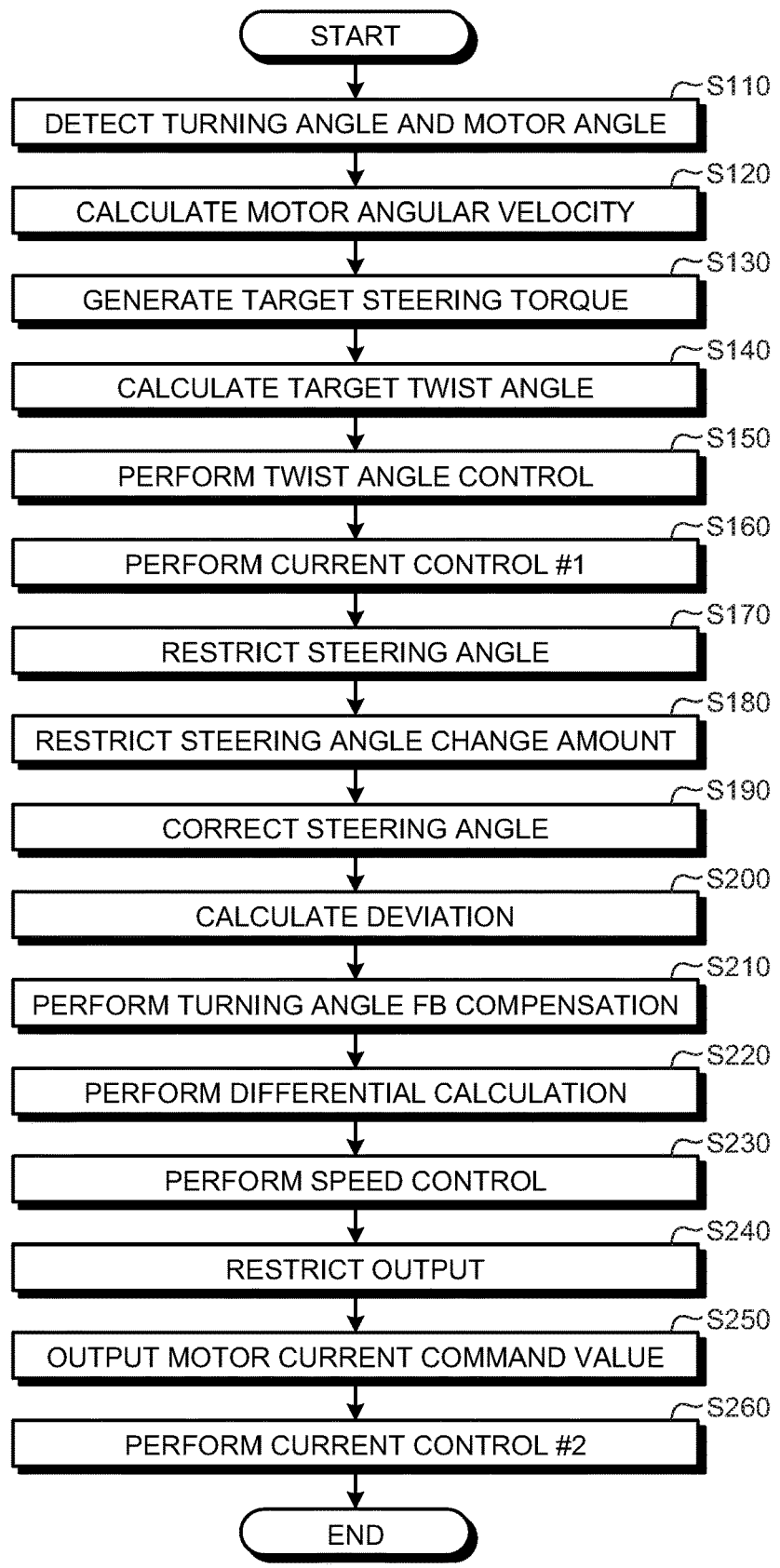
FIG. 7 is a flowchart illustrating an exemplary operation of the turning angle control unit.

An exemplary operation of the turning angle control unit in such a configuration will be described below with reference to a flowchart in FIG. 7. FIG. 7 is a flowchart illustrating the exemplary operation of the turning angle control unit.

Once the operation is started, the angle sensor 73 detects the turning angle θt and the angle sensor 74 detects the motor angle θm (step S110), and the turning angle θt and the motor angle θm are input to the turning angle control unit 920 and the angular velocity calculation unit 951, respectively.

The angular velocity calculation unit 951 calculates the motor angular velocity ωm by differentiating the motor angle θm and outputs the calculated motor angular velocity ωm to the twist angle control unit 300 (step S120).

Thereafter, a target steering torque generation unit 202 executes an operation same as that at steps S10 to S40 illustrated in FIG. 7 to perform current control by driving the reaction force motor 61 (steps S130 to S160).

Meanwhile, in the turning angle control, the target turning angle generation unit 910 receives the steering angle θh, and the steering angle θh is input to the restriction unit 931. The restriction unit 931 restricts the upper and lower limit values of the steering angle θh to upper and lower limit values set in advance (step S170), and outputs the steering angle θh as the steering angle θh1 to the rate restriction unit 932. The rate restriction unit 932 restricts the change amount of the steering angle θh1 based on a restriction value set in advance (step S180), and outputs the steering angle θh1 as the steering angle θh2 to the correction unit 933. The correction unit 933 obtains the target turning angle θtref by correcting the steering angle θh2 (step S190), and outputs the target turning angle θtref to the turning angle control unit 920.

Having received the turning angle θt and the target turning angle θtref, the turning angle control unit 920 calculates the deviation Δθt0 by subtracting the turning angle θt from the target turning angle θtref at the subtraction unit 927 (step S200). The deviation Δθt0 is input to the turning angle FB compensation unit 921, and the turning angle FB compensation unit 921 compensates the deviation Δθt0 by multiplying the deviation Δθt0 by a compensation value (step S210), and outputs the target turning angular velocity ωtref to the speed control unit 923. The turning angular velocity calculation unit 922 receives the turning angle θt, calculates the turning angular velocity ωft through differential calculation on the turning angle θt (step S220), and outputs the turning angular velocity ωft to the speed control unit 923. Similarly to the speed control unit 330, the speed control unit 923 calculates the motor current command value Imcta by I-P control (step S230), and outputs the motor current command value Imcta to the output restriction unit 926. The output restriction unit 926 restricts the upper and lower limit values of the motor current command value Imcta to upper and lower limit values set in advance (step S240), and outputs the motor current command value Imcta as the motor current command value Imct (step S250).

The motor current command value Imct is input to the current control unit 930, and the current control unit 930 performs current control by driving the drive motor 71 based on the motor current command value Imct and the current value Imd of the drive motor 71 detected by the motor current detector 940 (step S260).

Note that, the order of data input, calculation, and the like in FIG. 7 may be changed as appropriate. In addition, following control at the turning angle control unit 920 may be performed in a typically used control structure. The turning angle control unit 920 is not limited to a control configuration used for a vehicle device but may have any control configuration with which a real angle (in this example, the turning angle θt) follows a target angle (in this example, the target turning angle θtref), and for example, may have a control configuration used for an industrial positioning device, an industrial robot, or the like.

Embodiment

In the configuration illustrated in FIG. 1, the reaction force device 60 and the drive device 70 are controlled by one ECU 50 as described above. In an embodiment below, a configuration in which an ECU for the reaction force device 60 and an ECU for the drive device 70 are provided individually will be described.

Figure 8:
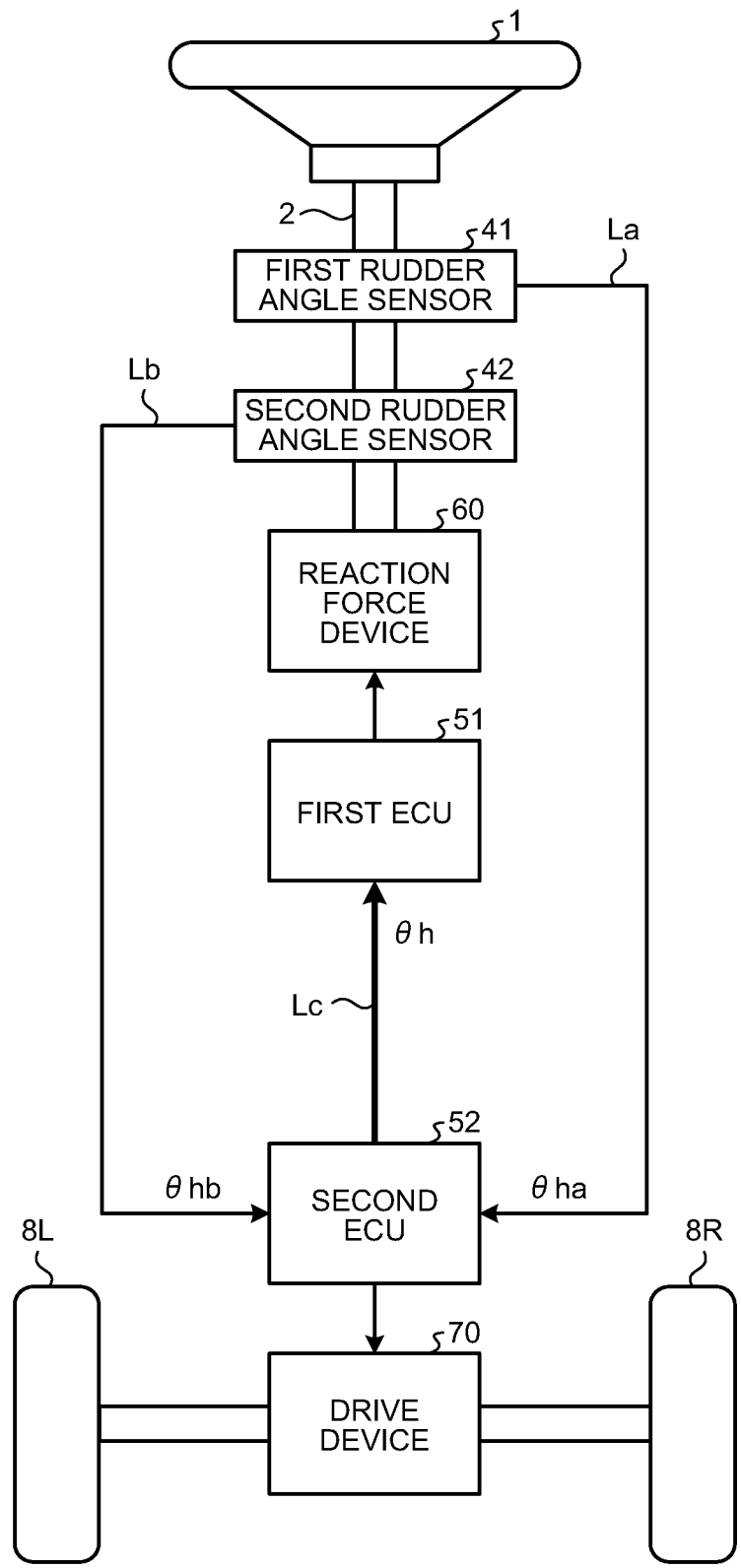
FIG. 8 is a diagram illustrating an exemplary system schematic configuration of a steer-by-wire vehicle steering device according to an embodiment.

FIG. 8 is a diagram illustrating an exemplary system schematic configuration a steer-by-wire vehicle steering device according to the embodiment. In the SBW system according to the present embodiment, a first ECU 51 for the reaction force device 60 and a second ECU 52 for the drive device 70 transmit and receive data through a communication line Lc as illustrated in FIG. 8.

The first ECU 51 corresponds to the first control unit in the present disclosure. Furthermore, the second ECU 52 corresponds to the second control unit in the present disclosure. Note that, hardware configurations of the first ECU 51 and the second ECU 52 are same as the configuration illustrated in FIG. 2, and thus description thereof is omitted here.

The first ECU 51 includes, as an internal block configuration, components corresponding to the target steering torque generation unit 200, the twist angle control unit 300, and the conversion unit 500 illustrated in FIG. 3. Specifically, the first ECU 51 has a steering reaction force control function to control the reaction force device 60 (reaction force motor 61) based on the steering angle θh of the wheel 1. Description of an operation of the steering reaction force control function at each of the target steering torque generation unit 200, the twist angle control unit 300, and the conversion unit 500 is omitted here.

The second ECU 52 includes, as an internal block configuration, components corresponding to the target turning angle generation unit 910 and the turning angle control unit 920 illustrated in FIG. 3. Specifically, the second ECU 52 has a turning drive control function to control the drive device 70 (drive motor 71) based on the steering angle θh of the wheel 1. Description of an operation of the turning drive control function at each of the target turning angle generation unit 910 and the turning angle control unit 920 is omitted here.

In FIG. 8, a first rudder angle sensor 41 and a second rudder angle sensor 42 correspond to the rudder angle sensor 14 illustrated in FIG. 1. The first rudder angle sensor 41 detects a steering angle θha of the wheel 1. The second rudder angle sensor 42 detects a steering angle θhb of the wheel 1. When the first rudder angle sensor 41 and the second rudder angle sensor 42 are both normal, the steering angle θha and the steering angle θhb are identical in effect. Accordingly, the configuration according to the present embodiment has redundancy for detection of the steering angle of the wheel 1 through duplication of a steering angle detection function.

In the present embodiment, the steering angle θha and the steering angle θhb as detected values of the first rudder angle sensor 41 and the second rudder angle sensor 42 are input to the second ECU 52 that controls the drive device 70. The steering angle θha is input to the second ECU 52 through a signal line La. The steering angle θhb is input to the second ECU 52 through a signal line Lb.

The second ECU 52 sets one of the steering angle θha as the detected value of the first rudder angle sensor 41 and the steering angle θhb as the detected value of the second rudder angle sensor 42 to be the steering angle θh of the wheel 1, performs turning drive control by actuating the drive device 70, and outputs the steering angle θh of the wheel 1 to the first ECU 51 through the communication line Lc.

The first ECU 51 performs steering reaction force control by actuating the reaction force device 60 based on the steering angle θh of the wheel 1 input from the second ECU 52 through the communication line Lc.

Figure 9:
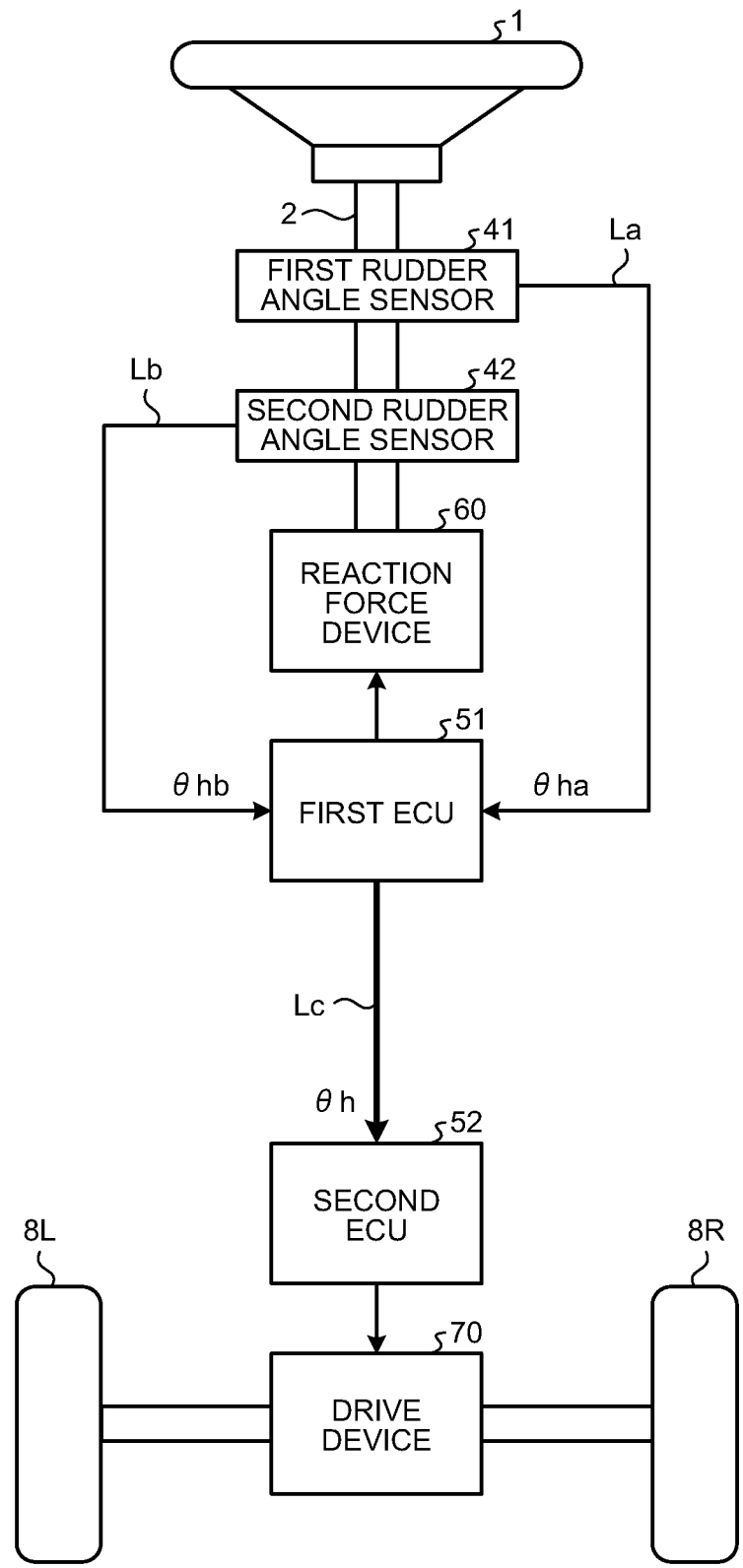
FIG. 9 is a diagram illustrating an exemplary system schematic configuration of a steer-by-wire vehicle steering device according to a comparative example.

FIG. 9 is a diagram illustrating an exemplary system schematic configuration of a steer-by-wire vehicle steering device according to a comparative example. In the vehicle steering device according to the comparative example illustrated in FIG. 9, the steering angle θha and the steering angle θhb as detected values of the first rudder angle sensor 41 and the second rudder angle sensor 42 are input to the first ECU 51 that controls the reaction force device 60, and one of the steering angle θha and the steering angle θhb is output from the first ECU 51 to the second ECU 52 that controls the drive device 70 through the communication line Lc. In this configuration of the comparative example illustrated in FIG. 9, when a communication system including the communication line Lc between the first ECU 51 and the second ECU 52 has failed, driving continuation is impossible while the turning drive control function for a drive device 60 is operated. Thus, it is needed to provide communication system redundancy through, for example, duplication of the communication system including the communication line Lc. Furthermore, in the configuration of the comparative example illustrated in FIG. 9, since communication including the communication line Lc is duplicated, it is needed to provide redundancy at both the first ECU 51 and the second ECU 52.

On the other hand, in the configuration of the present embodiment illustrated in FIG. 8, since the steering angle θha and the steering angle θhb as detected values of the first rudder angle sensor 41 and the second rudder angle sensor 42 are input to the second ECU 52 that controls the drive device 70 (drive motor 71), driving continuation is possible with the drive device 70 even when the communication system including the communication line Lc to the first ECU 51 that controls the reaction force device 60 (reaction force motor 61) has failed or the first ECU 51 has failed, and thus it is possible to achieve fail-safe functions of a vehicle system with a simple configuration. Accordingly, in the configuration of the present embodiment illustrated in FIG. 8, it suffices to have redundancy at the second ECU 52 and does not necessarily have redundancy at the first ECU 51 as described later with reference to FIG. 10. In the following, specific examples of processing of the present embodiment will be described with reference to FIGS. 10, 11, and 12.

Figure 10:
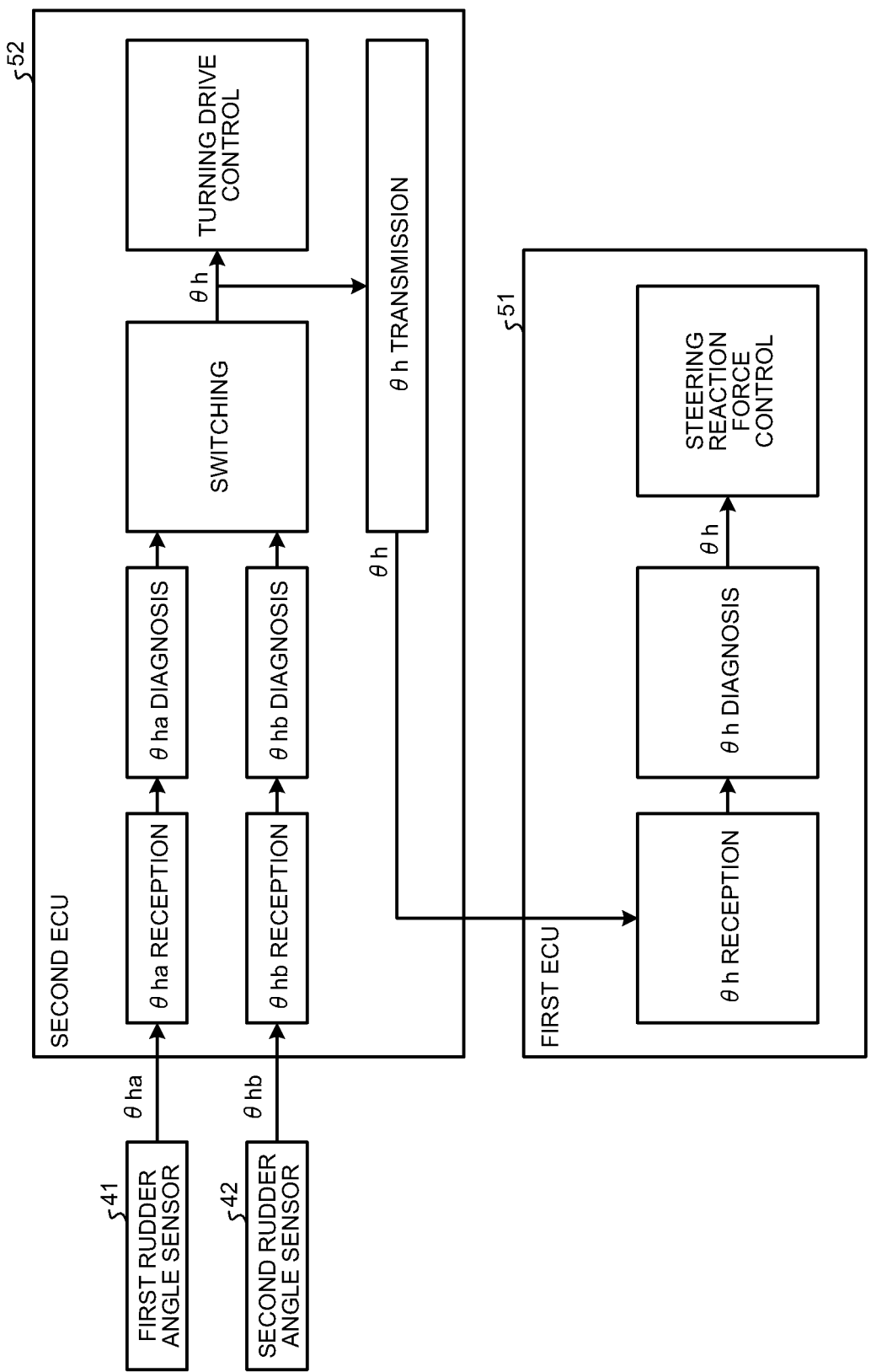
FIG. 10 is a diagram illustrating exemplary internal functional blocks of a first ECU and a second ECU.
Figure 11:
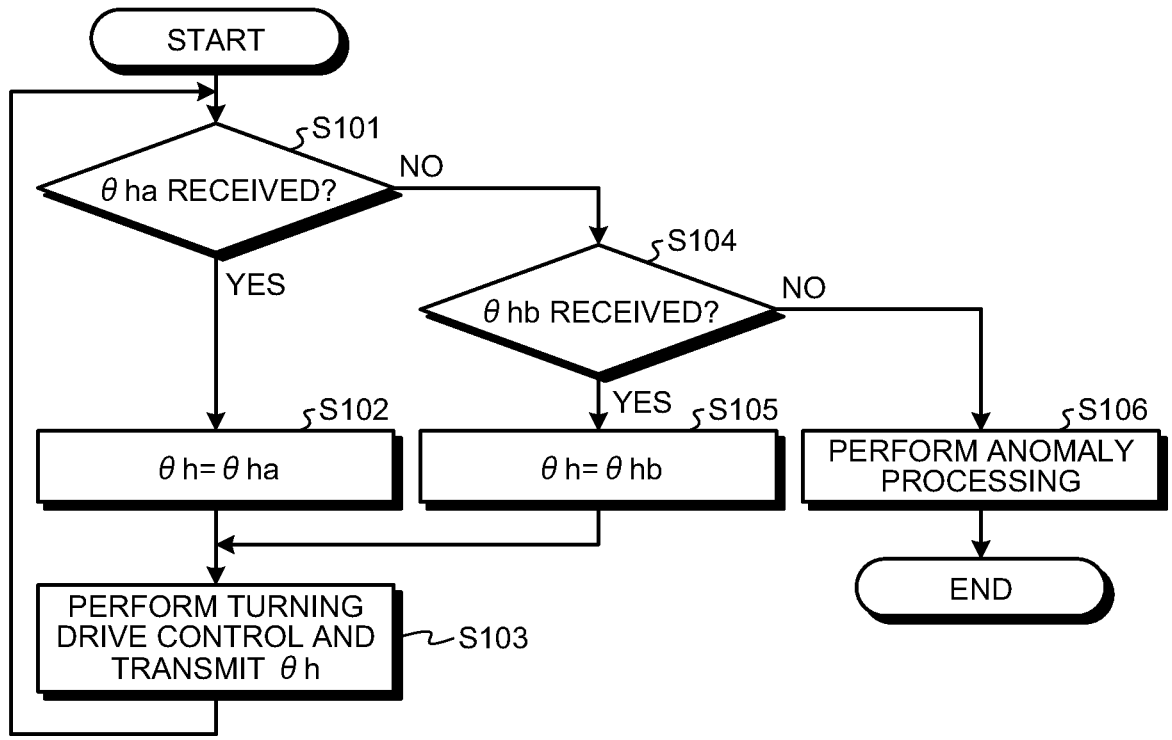
FIG. 11 is a flowchart illustrating an exemplary procedure of processing at the second ECU.
Figure 12:
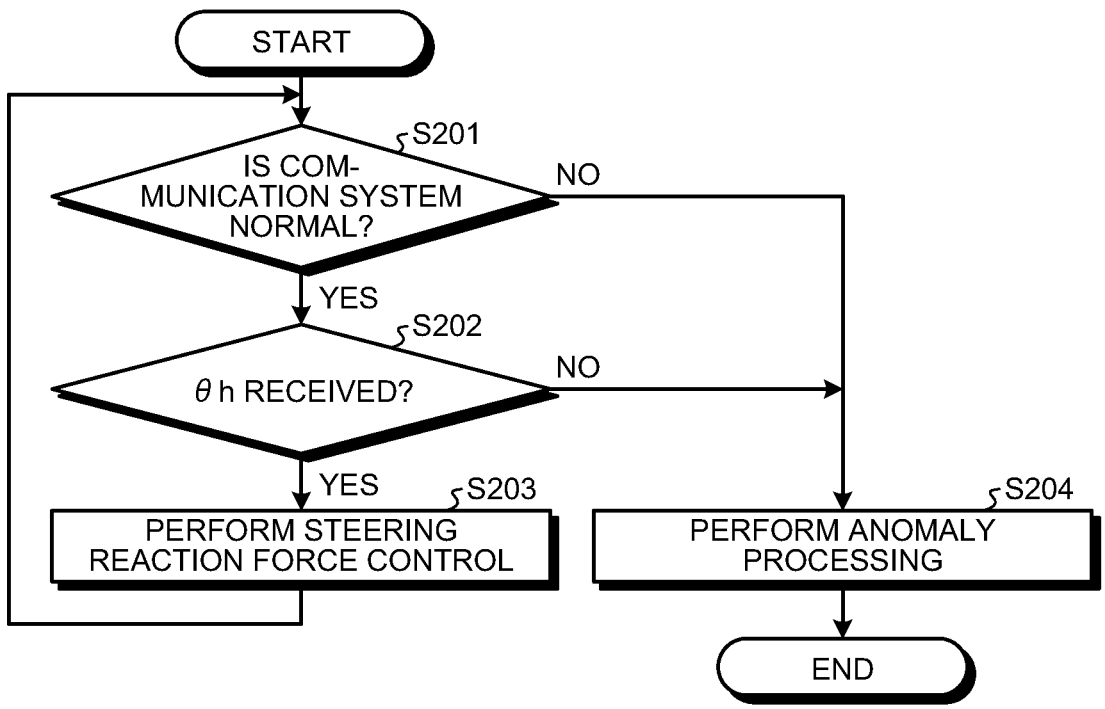
FIG. 12 is a flowchart illustrating an exemplary procedure of processing at the first ECU.

FIG. 10 is a diagram illustrating exemplary internal functional blocks of the first ECU and the second ECU. FIG. 11 is a flowchart illustrating an exemplary procedure of processing at the second ECU. FIG. 12 is a flowchart illustrating an exemplary procedure of processing at the first ECU.

First, the processing at the second ECU 52 will be described below.

The second ECU 52 determines whether the steering angle θha is received from the first rudder angle sensor 41 through the signal line La illustrated in FIG. 8 (step S101). A θha diagnosis function determines whether the steering angle θha is normally received by, for example, a θha reception functional component. When the steering angle θha is normally received, it is determined that the steering angle θha is received (Yes at step S101), or when the steering angle θha is not normally received, it is determined that the steering angle θha cannot be received (No at step S101). Specifically, when the steering angle θha cannot be received, it is indicated that any of the first rudder angle sensor 41, the signal line La, and the θha reception functional component has failed.

When the steering angle θha is received (Yes at step S101), the second ECU 52 sets the steering angle θha received from the first rudder angle sensor 41 to be the steering angle θh of the wheel 1 (step S102), controls the drive device 70 (drive motor 71) (turning drive control), and transmits the steering angle θh to the first ECU 51 through the communication system including the communication line Lc illustrated in FIG. 8 (step S103), and then returns to the processing at step S101. The θha diagnosis function applies, by a switching function, the steering angle θha received from the first rudder angle sensor 41 as the steering angle θh used for the turning drive control and the steering reaction force control.

When the steering angle θha cannot be received (No at step S101), the second ECU 52 determines whether the steering angle θhb is received from the second rudder angle sensor 42 through the signal line Lb illustrated in FIG. 8 (step S104). A θhb diagnosis function determines whether the steering angle θhb is normally received by, for example, a θhb reception functional component. When the steering angle θhb is normally received, it is determined that the steering angle θhb is received (Yes at step S104), or when the steering angle θhb is not normally received, it is determined that the steering angle θhb cannot be received (No at step S104). Specifically, when the steering angle θhb cannot be received, it is indicated that any of the second rudder angle sensor 42, the signal line Lb, and the θhb reception functional component has failed.

When the steering angle θhb is received (Yes at step S104), the second ECU 52 sets the steering angle θhb received from the second rudder angle sensor 42 to be the steering angle θh of the wheel 1 (step S105), controls the drive device 70 (drive motor 71) (turning drive control), transmits the steering angle θh to the first ECU 51 through the communication system including the communication line Lc illustrated in FIG. 8 (step S103), and then returns to the processing at step S101. The θhb diagnosis function applies, by a switching function, the steering angle θhb received from the second rudder angle sensor 42 as the steering angle θh used for the turning drive control and the steering reaction force control.

When the steering angle θhb cannot be received (No at step S104), the second ECU 52 performs predetermined anomaly processing (step S106), and ends the present processing. In the anomaly processing at the second ECU 52, for example, safe stop processing is performed in accordance with an automated driving level of a vehicle to which the vehicle steering device according to the present embodiment is applied, and the driver is notified of a rudder angle detection function including the first rudder angle sensor 41, the second rudder angle sensor 42, the signal lines La and Lb, the θha reception functional component, and the θhb reception functional component has failed. The driver may be notified of the failure of the rudder angle detection function through, for example, display on a display unit such as a meter panel, lighting of a light-emitting element such as an LED, or emission of alert sound. No limitations are provided by the aspect of the anomaly processing at the second ECU 52.

Subsequently, the processing at the first ECU 51 will be described below.

The first ECU 51 determines whether a communication system including the communication line Lc illustrated in FIG. 8, a θh reception functional component of the first ECU 51, and a θh transmission functional component of the second ECU 52 is normal (step S201). For example, a θh diagnosis function requests the second ECU 52 to transmit the steering angle θh and determines whether an ACK signal in response to the transmission request is received by the θh reception functional component. When the ACK signal is received, it is determined that the communication system is normal (Yes at step S201), or when the ACK signal is not received, it is determined that the communication system is anomalous (No at step S201). Specifically, the anomaly of the communication system indicates failure of the communication system including the communication line Lc, the θh reception functional component of the first ECU 51, and the θh transmission functional component of the second ECU 52.

When the communication system is normal (Yes at step S201), the first ECU 51 determines whether the steering angle θh is received from the second ECU 52 through the communication line Lc illustrated in FIG. 8 (step S202). The θh diagnosis function determines whether the steering angle θh is normally received by, for example, the θh reception functional component. When the steering angle θh is normally received, it is determined that the steering angle θh is received (Yes at step S202), or when the steering angle θh is not normally received, it is determined that the steering angle θh cannot be received (No at step S202). Specifically, when the steering angle θh cannot be received, it is indicated that the rudder angle detection function including the first rudder angle sensor 41, the second rudder angle sensor 42, the signal lines La and Lb, the θha reception functional component, and the θhb reception functional component has failed.

When the steering angle θh is normal (Yes at step S202), the first ECU 51 controls the reaction force device 60 (reaction force motor 61) (steering reaction force control) based on the steering angle θh received from the second ECU 52 (step S203), and then returns to the processing at step S201.

When the communication system is anomalous (No at step S201) or when the steering angle θh cannot be received (No at step S202), in other words, when the communication system or the rudder angle detection function has failed, the first ECU 51 performs predetermined anomaly processing (step S204), and ends the present processing. In the anomaly processing at the first ECU 51, for example, the steering reaction force control function is stopped, and the driver is notified of the stop of the steering reaction force control function. The driver may be notified of the stop of the steering reaction force control function through, for example, display on a display unit such as a meter panel, lighting of a light-emitting element such as an LED, or emission of alert sound. No limitations are provided by the aspect of the anomaly processing at the first ECU 51.

In the vehicle steering device according to the present embodiment, when the rudder angle detection function is normal, in other words, at least one of the steering angle θha as the detected value of the first rudder angle sensor 41 and the steering angle θhb as the detected value of the second rudder angle sensor 42 is normally received in the processing at the first ECU 51 (FIG. 11), and the processing at the second ECU 52 (FIG. 10), driving continuation is possible with the turning drive control of the drive device 70 (drive motor 71) by the second ECU 52 even in a case of failure of the communication system including the communication line Lc, the θh reception functional component, and the θh transmission functional component of the second ECU 52. Accordingly, it is possible to achieve fail-safe functions of a vehicle system with a simple configuration without having communication system redundancy through, for example, duplication of the communication system including the communication line Lc between the first ECU 51 and the second ECU 52.

Note that, the above-described embodiment presents the exemplary configuration in which the two rudder angle sensors of the first rudder angle sensor 41 and the second rudder angle sensor 42 are provided as rudder angle sensors, but three or more rudder angle sensors may be provided to have increased redundancy through further duplication of the rudder angle detection function. Moreover, duplicate elements are not limited to the rudder angle detection function, and for example, a torque detection function corresponding to the torque sensor 10 illustrated in FIG. 1 or a power source system for supply to each element may be duplicated, or internal configurations of the first ECU 51 and the second ECU 52 may be duplicated. In such a case, hardware components provided on semiconductor chips included in the first ECU 51 and the second ECU 52 may be duplicated, or a plurality of identical semiconductor chips may be mounted.

Furthermore, the communication system between the first ECU 51 and the second ECU 52 may be the CAN 40 or the non-CAN 40a illustrated in FIG. 1. No limitations are provided by the aspect of the communication system between the first ECU 51 and the second ECU 52.

Note that, the drawings used in the above description are conceptual diagrams for performing qualitative description of the present disclosure, and the present disclosure is not limited to these drawings. The above-described embodiments are preferable examples of the present disclosure, but not limited thereto, and may be modified in various manners without departing from the scope of the present disclosure.

REFERENCE SIGNS LIST 1 wheel
2 column shaft
3 deceleration mechanism
5 pinion rack mechanism
6a, 6b tie rod
7a, 7b hub unit
8L, 8R steering wheel
10 torque sensor
11 ignition key
12 vehicle speed sensor
13 battery
14 rudder angle sensor
41 first rudder angle sensor
42 second rudder angle sensor
50 control unit (ECU)
51 first ECU (first control unit)
52 second ECU (second control unit)
60 reaction force device
61 reaction force motor
70 drive device
71 drive motor
72 gear 73 angle sensor
130 current control unit
140 motor current detector
200 target steering torque generation unit
300 twist angle control unit
310 twist angle feedback (FB) compensation unit
320 twist angular velocity calculation unit
330 speed control unit
331 integration unit
332 proportional unit
333, 334 subtraction unit
340 stabilization compensation unit
350 output restriction unit
361 subtraction unit
362 addition unit
500 conversion unit
910 target turning angle generation unit
920 turning angle control unit
921 turning angle feedback (FB) compensation unit
922 turning angular velocity calculation unit
923 speed control unit
926 output restriction unit
927 subtraction unit
930 current control unit
931 restriction unit
933 correction unit
932 rate restriction unit
940 motor current detector
1001 CPU
1005 interface
1006 A/D converter
1007 PWM controller
1100 control computer (MCU)

The invention claimed is:

1. A vehicle steering device comprising:
a reaction force device configured to apply steering reaction force to a wheel;
a drive device configured to turn tires in accordance with steering of the wheel;
a first control unit configured to control the reaction force device;
a second control unit configured to control the drive device;
a plurality of rudder angle sensors configured to detect steering angles of the wheel and output the detected steering angles to the second control unit; and
a communication system configured to transmit at least one of the steering angles of the wheel as detected values of the rudder angle sensors from the second control unit to the first control unit, wherein
the second control unit sets any one of the detected values of the rudder angle sensors to be a steering angle of the wheel, controls the drive device, and outputs the steering angle of the wheel to the first control unit through the communication system,
the first control unit controls the reaction force device based on the steering angle of the wheel, the steering angle being input from the second control unit through the communication system,
the rudder angle sensors include a first rudder angle sensor and a second rudder angle sensor,
when a detected value of the first rudder angle sensor is received, the second control unit sets the detected value to be the steering angle of the wheel, controls the drive device, and outputs the steering angle of the wheel to the first control unit through the communication system, and
when the detected value of the first rudder angle sensor is not able to be received, the second control unit sets a detected value of the second rudder angle sensor to be the steering angle of the wheel, controls the drive device, and outputs the steering angle of the wheel to the first control unit through the communication system,
the first control unit performs predetermined anomaly processing when the steering angle of the wheel is not able to be received or the communication system has failed, and
the second control unit performs predetermined anomaly processing when all the detected values of the rudder angle sensors cannot be received.

2. The vehicle steering device according to claim 1, wherein
the second control unit performs processing of determining whether the detection value of the first rudder angle sensor is received, and when the detection value of the first rudder angle sensor is not able to be received, the second control unit performs processing of determining whether the detection value of the second rudder angle sensor is received, and
the first control unit performs processing of determining whether the communication system is normal, and when the communication system is normal, the first control unit performs processing of determining whether the steering angle of the wheel is received.

* * * * *